US012521765B2

(12) United States Patent
Johansson et al.

(10) Patent No.: US 12,521,765 B2
(45) **Date of Patent: *Jan. 13, 2026**

(54) GARMENT SORTING SYSTEM AND METHOD

(71) Applicant: JENSEN SWEDEN AB, Borås (SE)

(72) Inventors: Magnus Johansson, Sjömarken (SE); Anders Hansen, Panama City Beach, FL (US)

(73) Assignee: JENSEN SWEDEN AB, Borås (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/939,148

(22) Filed: Nov. 6, 2024

(65) Prior Publication Data

US 2025/0144670 A1 May 8, 2025

Related U.S. Application Data

(63) Continuation-in-part of application No. 18/503,621, filed on Nov. 7, 2023, now Pat. No. 12,168,247.

(51) Int. Cl.

| | |
|---|---|
| ***B07C 3/08*** | (2006.01) |
| ***B07C 3/14*** | (2006.01) |
| ***D06F 93/00*** | (2006.01) |

(52) U.S. Cl.
CPC ................ *B07C 3/082* (2013.01); *B07C 3/14* (2013.01); *D06F 93/00* (2013.01)

(58) Field of Classification Search
CPC ............ B07C 3/082; B07C 3/14; D06F 93/00
(Continued)

(56) References Cited

U.S. PATENT DOCUMENTS 4,991,719 A * 2/1991 Butcher .................... G06F 7/08 198/465.4
5,072,822 A * 12/1991 Smith ....................... G06F 7/08 198/465.4
(Continued)

FOREIGN PATENT DOCUMENTS

EP 4119242 1/2023

OTHER PUBLICATIONS

"U.S. Appl. No. 18/503,621, Non Final Office Action mailed Apr. 11, 2024", 7 pgs.

(Continued)

*Primary Examiner* — Terrell H Matthews
(74) *Attorney, Agent, or Firm* — Schwegman Lundberg & Woessner, P.A.

(57) ABSTRACT

The invention relates to a garment sorting system and method for sorting garments arranged on garment carriers. The system comprises a first transporting conveyor arrangement (5) arranged to receive a garment carrier from a pairing station which transports the garment carriers to an identification and sorting arrangement on a second conveyor arrangement comprising an identification device arranged to identify a garment carrier from an identification code for further sorting. For each garment carrier, a sorting rail address is requested by the identification and sorting arrangement from a garment identification database. The identified garment carrier is transported to a plurality of sorting rails, where the second transporting conveyor arrangement comprises a sorting interface for each sorting rail such that the identified garment carrier is moved from the second transporting conveyor arrangement to the correct sorting rail by operation of the corresponding sorting interface.

17 Claims, 4 Drawing Sheets

(58) Field of Classification Search
USPC ........................................................ 209/3.1
See application file for complete search history.

(56) References Cited

U.S. PATENT DOCUMENTS

| | | | | | |
|---|---|---|---|---|---|
| 5,299,134 | A * | 3/1994 | Speckhart | B07C 5/361 | 198/349.95 |
| 5,301,809 | A * | 4/1994 | Skinner | B07C 5/3412 | 209/583 |
| 5,377,814 | A * | 1/1995 | Smith | B65G 47/50 | 198/465.4 |
| 5,687,850 | A | 11/1997 | Speckhart et al. | | |
| 5,881,886 | A * | 3/1999 | Lawandy | H01S 3/06 | 209/579 |
| 5,964,354 | A * | 10/1999 | Skinner | B07C 5/3412 | 198/465.4 |
| 2001/0032805 | A1 * | 10/2001 | Lawandy | B07C 5/365 | 209/579 |

OTHER PUBLICATIONS

"U.S. Appl. No. 18/503,621, Notice of Allowance mailed Aug. 12, 2024", 10 pgs.
"U.S. Appl. No. 18/503,621, Response filed Jul. 3, 2024 to Non Final Office Action mailed Apr. 11, 2024", 9 pgs.
"European Application No. 24211061.7, Search Report dated Apr. 4, 2025", (Apr. 4, 2025), 5 pgs.

* cited by examiner

GARMENT SORTING SYSTEM AND METHOD

CLAIM FOR PRIORITY

This application is a continuation-in-part and claims the benefit of priority of U.S. application Ser. No. 18/503,621, filed Nov. 7, 2023, which is hereby incorporated by reference in its entirety.

TECHNICAL FIELD

The invention relates to a garment sorting system and method.

BACKGROUND ART

Heavy-duty laundry industry consists of many different material handling systems, each consisting of conveyor systems and conveyor installations including more or less intelligent control systems for handling and transporting goods, e.g. clothes or garments. In many applications, sorting garments is necessary to ensure that the correct garments are sent to the correct institution or company. Today, on one end of the spectrum, manual sorting solutions exits. Initially, a laundry operator identifies the garment and pairs it with a garment carrier when it is hung on the garment carrier. When the garment has reached a sorting station, a further laundry operator moves it to different sorting rails for further processing. On the other end of the spectrum, fully automatic pairing and sorting exists.

Even though some automatization has been made, such as the laundry operator receiving the sorting rail from a database, the need for manual handling of the garment carriers is still present due to the large difference in cost between manual sorting and fully automatic sorting. It may not be feasible to replace a manual system with a fully automatic system due to the high cost of investment the replacement carries.

There is thus a need for improvements within the automatization of manual sorting systems.

SUMMARY OF THE INVENTION

An object of the present disclosure is to provide a garment sorting system and a method for sorting garments arranged on garment carriers that seeks to mitigate, alleviate, or eliminate one or more of the above-identified deficiencies in the art and disadvantages singly or in any combination.

This object is obtained by a garment sorting system, wherein the system comprises:

- a first transporting conveyor arrangement arranged to receive one or more garment carriers from a pairing station on which a piece of garment is manually hung by an operator and paired with the garment carrier, wherein the first transporting conveyor arrangement is arranged to transport the garment carriers to an identification and sorting arrangement arranged on a second conveyor arrangement,
- the identification and sorting arrangement comprising an identification device arranged to identify a garment carrier from an identification code on the garment carrier or on the garment for further sorting, wherein the identification and sorting arrangement is arranged to request, for each garment carrier, one or more sorting rail addresses from a garment identification database,
- the second transporting conveyor arrangement arranged to transport the identified garment carrier to a plurality of sorting rails, wherein the second transporting conveyor arrangement comprises a sorting interface for each sorting rail, such that the identified garment carrier is moved from the second transporting conveyor arrangement to the sorting rail corresponding to the sorting rail address by operation of the corresponding sorting interface.

A garment sorting system according to the invention allows for the partial automatization of a previously completely manual garment sorting system. The garment sorting system according to the invention can be implemented into an existing heavy-duty laundry industry by replacing parts that today use manual sorting with an automatic system. The system according to the invention may be arranged to interface with an existing industry's garment identification database, in the context of this application called an external garment identification database, such that already implemented sorting algorithms can be applied. Alternatively, all identification and sorting information can be received beforehand and be arranged in an internal garment identification database in the identification and sorting arrangement.

The garment identification database is initially used to manually pair a garment with a garment carrier, but for existing industries where the following steps of sorting the garments are made manually, the system according to the invention will save time and money.

When the system has sorted a garment by means of receiving a sorting rail address from the garment identification database based on the identified garment carrier, the garment sorting system according to the invention transports the identified and sorted garment on the corresponding garment carrier to a sorting rail corresponding to the sorting rail address, where sorting rail belongs to the existing heavy-duty laundry industry.

Depending on the sorting need, one or several garment sorting systems according to the invention can be applied in series and/or in parallel.

The garment sorting system may comprise at least one buffer rail, wherein the identified garment carrier is moved from the second transporting conveyor arrangement to the buffer rail corresponding to the sorting rail address by operation of the corresponding sorting interface. In this way, the garment sorting system can send garment carriers to a buffer that allows an input of a greater number of garments than can be sorted otherwise. The buffer can also be used to even out the spacing between garments or to separate batches of clothes such that they can be sorted in a different order than they were hung initially. The buffer can also be used to collect individual garments that may have come out of order for some reason.

The identification device may be one of a camera arranged to identify a barcode and/or a colour code, a barcode reader or a wireless sensor tag reader for reading an identification code on a wireless sensor tag. In this way, the system can be modified for various existing types of identification codes as well as be easily adaptable for new. Other identification codes possible are quick-response (QR) codes, radio-frequency identification (RFID) tags, near-field communication (NFC) tags, Bluetooth® tags or similar.

When the identification device is a camera, the identification and sorting arrangement may be arranged to use artificial intelligence for identification of the garment on the garment carrier. In case that a camera is used for identifying the garment carrier for sorting the garment based on identifying the garment itself or parts of the identification code that may otherwise have been insufficient to identify the garment.

Identification of the garment carrier by the identification device may be triggered by an identification trigger on the second transporting conveyor arrangement. In this way, the garment sorting system can be arranged to only operate during times when identification is necessary. This may for instance save power and reduce the need for data transfer.

The garment identification database may be an external garment identification database arranged to be connected to the identification and sorting arrangement, or an internal garment identification database arranged in the identification and sorting arrangement. In this way, the garment sorting system can flexibly be arranged to receive the necessary information needed to sort the garments.

If an external database is used, the external garment identification database may be connected to the identification and sorting arrangement by an application programming interface (API) or by a structured query language (SQL) store procedure. By using an API or SQL store procedure that is configured to connect to and to send/receive data from the external garment identification, it is easy to set up the system. Using an API or SQL store procedure further makes it easy and economical to connect a system according to the invention to an external garment identification system at different sorting systems using the same pairing software for the initial pairing of the garment with the garment carrier.

The garment identification system may be arranged to sort unidentified garment carriers to an unidentified garment sorting rail. In case a garment or garment carrier cannot be identified, any such garments will be placed on an unidentified garment sorting rail to be fed back to the system for resorting or to be sorted manually.

The garment identification system may be arranged to detect a garment carrier comprising a final garment of a garment batch. When dealing with garments that belong to different institutions or companies or different departments of an institution or company, it is important to know when a batch of garments belonging to that institution/department ends such that garments from different institutions/departments do not mix.

The second transporting conveyor arrangement may be arranged to transport the garment carriers with a predetermined separation of the garment carriers. In order to obtain a secure identification of the garment carriers, the second transporting conveyor arrangement may comprise drive dogs or pusher dogs separated by a distance that will allow the identification and sorting arrangement to properly identify the garment carrier without risking that one garment carrier obstructs another, leading to misidentification or no identification of garment carriers.

This object is also obtained by a method for sorting garments arranged on garment carriers, wherein the method comprises:

receiving, on a first transporting conveyor arrangement, one or more garment carriers from a pairing station on which a piece of garment is manually hung by an operator and paired with the garment carrier, transporting, by the first transporting conveyor arrangement, the garment carriers to an identification and sorting arrangement arranged on a second transporting conveyor arrangement, identifying, by an identification and sorting arrangement comprising an identification device, a garment carrier from an identification code on the garment carrier or on the garment for further sorting, wherein the identification and sorting arrangement is arranged to be connected to a garment identification database, requesting, for each garment carrier, by the identification and sorting arrangement in communication with a garment identification database, one or more sorting rail address from a garment identification database, transporting, on the second transporting conveyor arrangement, the identified garment carrier to a plurality of sorting rails, wherein the second transporting conveyor arrangement comprises a plurality of sorting interfaces arranged to connect to each sorting rail, such that the identified garment carrier is moved from the second transporting conveyor arrangement to the sorting rail corresponding to the sorting rail address by operation of the corresponding sorting interface.

The advantages are the same as described for the system.

When the identification device is a camera, the method may comprise:

using artificial intelligence by the identification and sorting arrangement for identification of for identification of the garment on the garment carrier.

The method may comprise:

triggering identification of the garment carrier by the identification device by an identification trigger on the second transporting conveyor arrangement.

The method may comprise:

connecting the external garment identification database to the identification and sorting arrangement by an application programming interface.

The method may comprise:

sorting unidentified garment carriers to an unidentified garment sorting rail.

The method may comprise:

detecting a garment carrier comprising a final garment of a garment batch.

The method may comprise:

transporting the garment carriers with a predetermined separation of the garment carriers on the second transporting conveyor arrangement.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
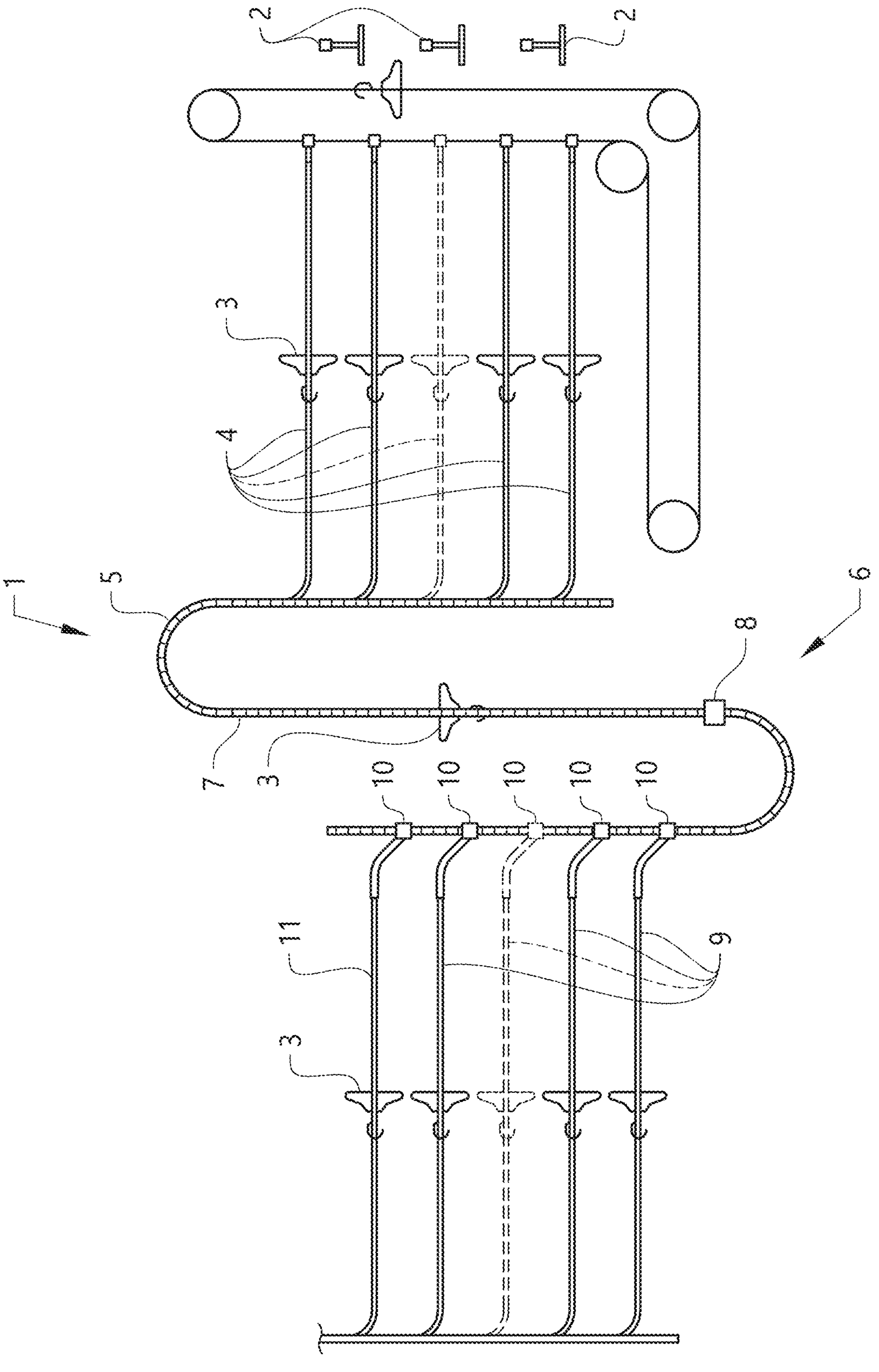
FIG. 1 schematically shows a garment sorting system according to a first example embodiment, FIG. 2 schematically shows a garment sorting system according to a second example embodiment, FIG. 3 schematically shows a flowchart over the method of the invention according to an example embodiment.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms “a”, “an” and “the” are intended to include the plural forms as well, unless the context clearly indicates otherwise.

FIG. 1 schematically shows a garment sorting system 1 according to a first example embodiment.

At a pairing station 2 of a heavy-duty laundry industry, a laundry operator takes a garment and a garment carrier 3, scans a garment identification code and a garment carrier identification code and pairs the two such that the garment carrier 3 contains the information on where the garment is ultimately to end up after final sorting is made. The laundry operator receives a first sorting address and places the garment carrier 3 on a mechanical sorting dog such as a garment carrier with a shark fin where the garment carriers 3 depending on how they are hung on the mechanical sorting dog will be transferred to different initial transporting rail 4. The pairing and transporting of the garment carrier to the initial transporting rail 4 is known in the art.

The garment sorting system 1 comprises a first transporting conveyor arrangement 5 arranged to receive one or more garment carriers 3 from the pairing station 2.

After being moved from the pairing station 2, the garment carriers 3 are moved on the initial transporting rails 4 towards the first transporting conveyor arrangement 5, either manually or by motorised rails. Interfaces between the first transporting conveyor arrangement 5 and the initial transporting rails 4 move the garment carriers 3 onto the first transporting conveyor arrangement 5. The interfaces are known in the art.

In some examples, the initial sorting rails 4 are not necessary and the garment carriers 3 can be placed directly onto the first transporting conveyor arrangement 5 from the pairing station 2.

The first transporting conveyor arrangement 5 thereafter transports the garment carriers 3 to an identification and sorting arrangement 6 arranged on a second transporting conveyor arrangement 7 connected to and following the first transporting conveyor arrangement 5.

The identification and sorting arrangement 6 comprises an identification device 8 arranged to identify a garment carrier 3 from an identification code either on the garment carrier or on the garment (or both) for further sorting on one or several sorting stages. The identification and sorting arrangement 6 is arranged to request identification and sorting information for each garment carrier 3 from a garment identification database, i.e. a database provided by the proprietor of the laundry industry. The database comprises all information necessary for all garments to be sorted properly and can be accessed via an interface between the identification and sorting arrangement 6 and the proprietor’s database, i.e. an external database, or all identification and sorting information can be received beforehand from the proprietor and can be arranged in an internal database in the identification and sorting arrangement 6. Importantly, for each garment carrier 3, the identification and sorting arrangement 6 requests one or more sorting rail addresses from the garment identification database depending on the number of sorting stages in the laundry. In this way, the identification and sorting arrangement 6 ensures that all garments are properly sorted independently of the number of sorting stages.

The external garment identification database is as one example connected to the identification and sorting arrangement 6 by an application programming interface. Alternatively, a structured query language (SQL) store procedure can be used to interact with the external garment identification database.

The second transporting conveyor arrangement 7 is arranged to transport the identified garment carrier 3, now having a sorting rail address attached to it, to a number of sorting rails 10. In order to transfer the identified garment carrier 3 to the corresponding sorting rail 9, the second transporting conveyor arrangement 7 comprises a plurality of sorting interfaces 10 arranged to be connected to the sorting rails 9. The sorting interfaces 10 are connected to the identification and sorting arrangement 6 such that the corresponding sorting interface 10 operate to open towards the corresponding sorting rail 9 when the identified garment carrier 3 approaches the sorting interface 10 corresponding to the sorting rail address received. One sorting interfaces 10 is connected to each sorting rail 9. For instance, if a garment carrier has received a sorting rail address of 3, the identification and sorting arrangement 6 instructs the sorting interface 10 connected to the third sorting rail 9 to operate, i.e. to open when the garment carrier approaches the sorting interface 10. The number of sorting rails 9 can be adapted to the need of the proprietor. The second transporting conveyor arrangement 7 is adapted accordingly.

In this way, a manually performed second sort is replaced by an automated garment sorting system according to the invention.

The sorting rails 10 can be a rail where the garment carriers need to be moved forward to the next station such as ironing, pressing, folding etc., manually by a laundry operator or the sorting rails 10 can be motorised such that once the garment carriers 3 have entered the correct sorting rail 9, they are automatically moved forward by some sort of conveyor arrangement on the sorting rail 9.

The sorting interfaces 10 are connections between the second transporting conveyor arrangement 7 and each sorting rail 9. The sorting interfaces 10 suitable for the garment sorting system 1 according to the invention are known in the art.

The identification device 8 may be one of a camera arranged to identify a barcode and/or a colour code, a barcode reader or a wireless sensor tag reader. Possible identification codes also include quick-response (QR) codes, radio-frequency identification (RFID) tags, near-field communication (NFC) tags, Bluetooth® tags or similar.

In case the identification device 8 is a camera, the identification and sorting arrangement 6 is arranged to use artificial intelligence for identification of the garment on the garment carrier 3. This can for instance be in the form of machine learning from a number of garments to at least identify the garment type, e.g. t-shirts, shirts, pants, skirts, jackets etc, or to use machine learning to teach the system to distinguish partially obstructed identification codes for sorting. In some cases, a garment or garment carrier 3 cannot be identified. If this happens, the garment identification system 1 is arranged to sort any unidentified garment carriers to an unidentified garment sorting rail 11. From the unidentified garment sorting rail 11, the unidentified garment carrier can be returned to the identification and sorting arrangement 6 to be identified again or be transported to a separate station for manual identification.

In order to detect when all garments of a batch of clothes has been identified and sorted, a garment carrier 3 comprising a final garment of a garment batch is placed on the initial transporting rail 4 of the pairing station 2. When this garment carrier 3 reaches the garment identification system 1, it detects the garment carrier comprising a final garment of a garment batch.

The second transporting conveyor arrangement 7 may further comprise an identification trigger that triggers identification of the garment carrier 3 by the identification device 8. The trigger may for instance be a mechanical, electromechanical, optical, inductive or capacitive trigger.

The second transporting conveyor arrangement 7 may also comprise drive dogs or pusher dogs arranged on the second transporting conveyor arrangement 7 at predetermined distances between them, for instance 100-1000 mm. In this way, the garment carriers 3 are transported to the identification and sorting arrangement 6 with a predetermined separation of the garment carriers 3. Depending on if the identification is to be made by identifying the garment carrier 3 or the garment on the garment carrier 3, the distance between the drive dogs or pusher dogs is different.

With first transporting conveyor arrangement and second transporting conveyor arrangement is meant one conveyor that for the purpose of the invention is made to comprise two parts or alternatively two separate conveyors that are arranged in series. The necessary drives to operate the transporting conveyor arrangements and the connections between them, if necessary, are known in the art.

Figure 2:
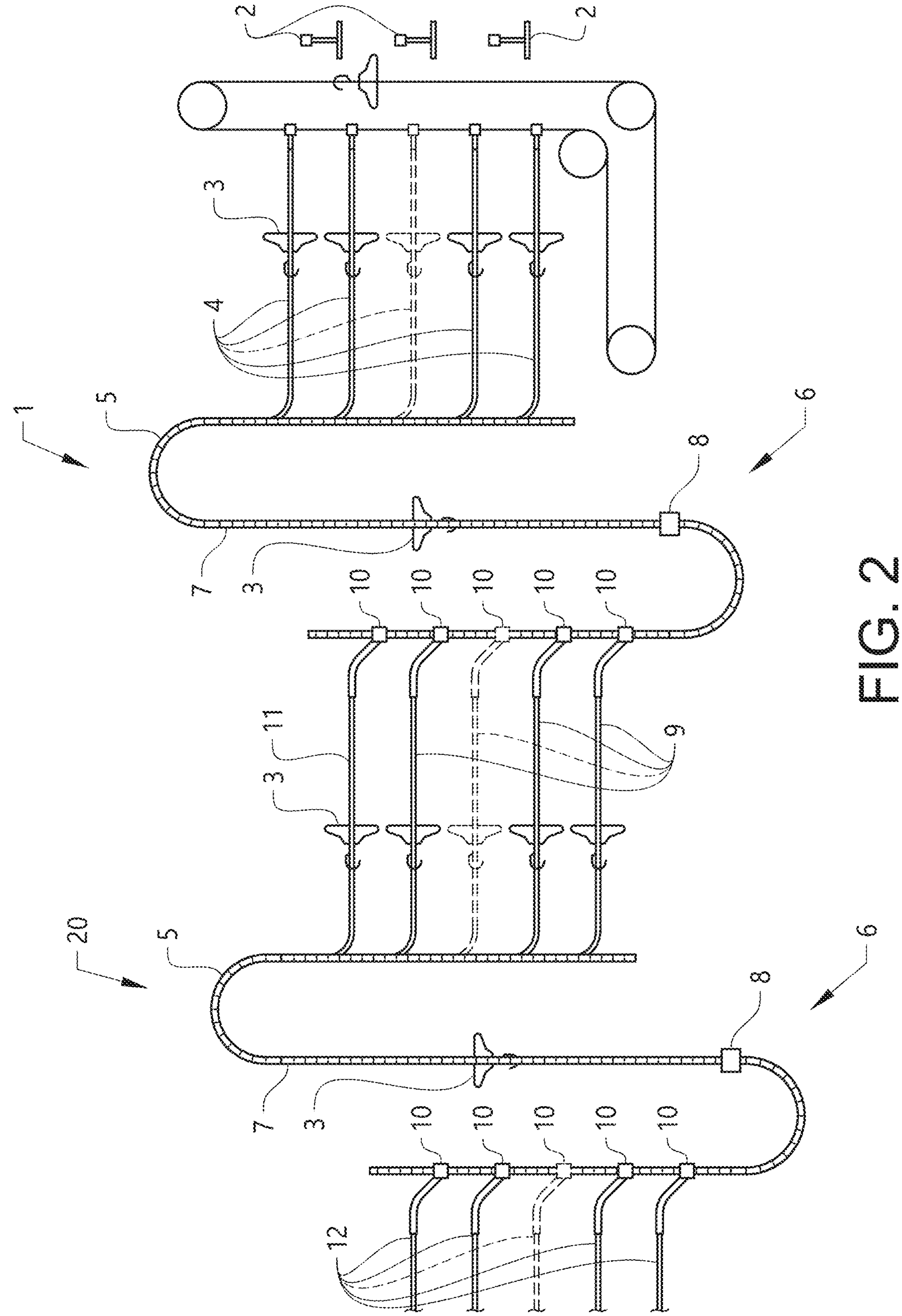

FIG. 2 schematically shows a garment sorting system according to a second example embodiment. The difference from the garment sorting system 1 of the first example embodiment is that the garment sorting system 1 of FIG. 2 comprises an additional second garment sorting system 20 arranged downstream of an initial first garment sorting system 1 according to FIG. 1. Alternatively, it can also be arranged parallel to the initial first garment sorting system 1 of FIG. 1. The first transporting conveyor arrangement 5 of additional second garment sorting system 20 is connected to the sorting rails 9 and thereby arranged to receive the sorted garment carriers 3 from the initial first garment sorting system 1. In the example shown the first transporting conveyor arrangement 5 is also connected to the unidentified garment sorting rail 11, although this is not necessary. The second transporting conveyor arrangement 7 of additional second garment sorting system 20 is connected to further sorting rails 12, which may or may not comprise an unidentified garment sorting rail.

The additional second garment sorting system 20 comprises the same transporting conveyor arrangements 5, 7 and identification and sorting arrangement 6 as the initial first garment sorting system 1 of FIG. 1. The additional second garment sorting system 20 is arranged to provide a more detailed sort of the garments where necessary.

In this way, a manually performed third sort is replaced with an automated garment sorting system according to the invention.

It is possible to arrange a third, a fourth etc. garment sorting systems either in series or in parallel with the additional second garment sorting system 20 in FIG. 2 in order to customize the laundry industry to the proprietor's needs.

Figure 3:
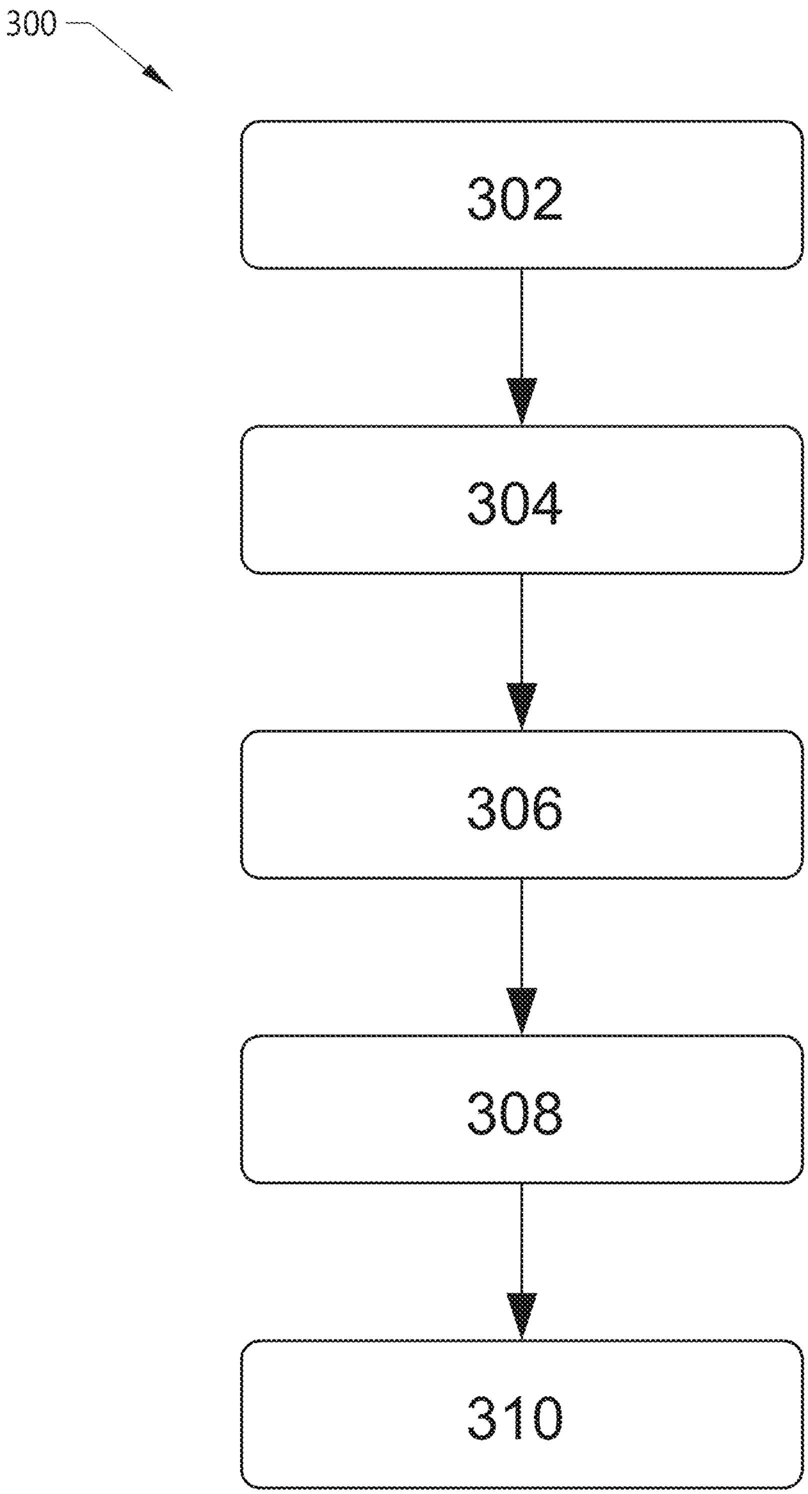

FIG. 3 schematically shows a flowchart over a method 300 of the invention according to an example embodiment. The described method is a method for sorting garments arranged on garment carriers. In method step 302, one or more garment carriers are received, on a first transporting conveyor arrangement, from a pairing station on which a piece of garment is manually hung by an operator and paired with the garment carrier. In method step 304, the garment carriers are transported, by the first transporting conveyor arrangement, to an identification and sorting arrangement arranged on a second transporting conveyor arrangement. In method step 306, a garment carrier is identified by an identification and sorting arrangement comprising an identification device from an identification code on the garment carrier or on the garment for further sorting, wherein the identification and sorting arrangement is arranged to be connected to a garment identification database. IN method step 308, for each garment carrier, a sorting rail address from the garment identification database is requested by the identification and sorting arrangement. In method step 310, the identified garment carrier is transported, on the second transporting conveyor arrangement, to a plurality of sorting rails, wherein the second transporting conveyor arrangement comprises sorting interfaces with the sorting rails, such that the identified garment carrier is moved from the second transporting conveyor arrangement to the correct sorting rail by operation of the corresponding sorting interface.

Figure 4:
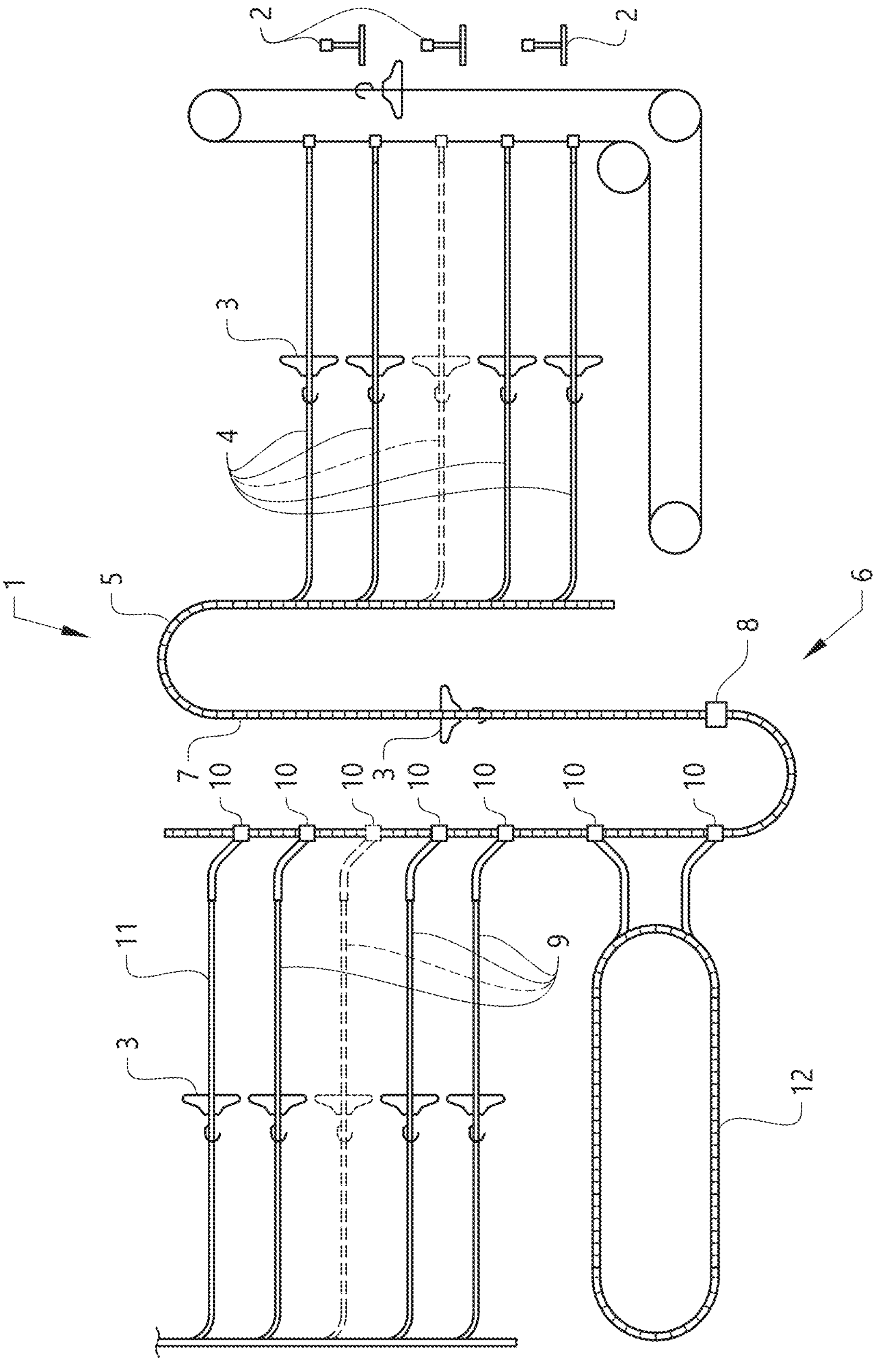
FIG. 4 schematically shows an example of a garment sorting system according to a second example embodiment.

FIG. 4 schematically shows a garment sorting system 1 according to a third example embodiment. The difference from the garment sorting system 1 of the first example embodiment is that the garment sorting system 1 of FIG. 2 comprises a buffer rail 12 arranged downstream of an initial first garment sorting system 1 according to FIG. 1. After identification of the garment carrier by the identification device 8, the garment sorting system 1 has the option to send garment carriers to the buffer rail 12 instead of to the sorting rails 9 to allow for an input of a greater number of garments than can be sorted otherwise. The buffer rail 12 can also be used to even out the spacing between garments or to separate batches of clothes such that they can be sorted in a different order than they were hung initially. The buffer rail 12 can also be used to collect individual garments that may have come out of order for some reason.

The buffer rail 12 is connected to the first transporting conveyor arrangement 5 in the same way as the sorting rails 9, i.e. by sorting interfaces 10. When the garment carriers 3 that have been sent to the buffer rail 12 is to be sorted into the correct sorting rails 9, the garment carriers 3 are sent back to the first transporting conveyor arrangement 5 by means of another sorting interface 10 or similar interface to allow the garment carriers 3 to return to the first transporting conveyor arrangement 5. The garment carriers 3 sent to the buffer rail 12 can automatically be sent back to first transporting conveyor arrangement 5 for further sorting in sorting rails 9.

When the buffer rail 12 is empty, a new batch of garment carriers 3 can be sent from pairing station 2.

Further buffer rails 12 can be arranged throughout the garment sorting system 1 if needed. One of more buffer rails 12 can be arranged in both embodiments of FIGS. 1 and 2.

Example 1: A garment sorting system, wherein the system comprises:

- a pairing station on which a piece of garment is manually hung by an operator and paired with a garment carrier;
- an interface extending between the pairing station and a first transporting conveyor arrangement, the interface configured to transfer the garment carrier from the pairing station to the first transporting conveyor arrangement, the first transporting conveyor arrangement configured to transport the garment carrier to an identification and sorting arrangement arranged on a second conveyor arrangement;
- a plurality of sorting interfaces extending between a second transporting conveyor arrangement and a plurality of sorting rails;

wherein:

the identification and sorting arrangement comprises an identification device configured to:

identify the garment carrier from an identification code on the garment carrier or on the garment for further sorting; and request, based on the identification code, a sorting rail address from a garment identification database, the sorting rail address indicative of a respective sorting rail of a plurality of sorting rails; and the second transporting conveyor arrangement configured to:

transport the identified garment carrier to the respective sorting rail via a respective sorting interface of the plurality of sorting interfaces, the respective sorting interface configured to move the garment carrier to the respective sorting rail corresponding to the sorting rail address received by the identification and sorting arrangement from the garment identification database.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

REFERENCES

1. Garment sorting system
2. Pairing station
3. Garment carriers
4. Initial transporting rail
5. First transporting conveyor arrangement
6. Identification and sorting arrangement
7. Second transporting conveyor arrangement
8. Identification device
9. Sorting rail
10. Sorting interfaces
11. Unidentified sorting rail
12. Buffer rail
20. Additional garment sorting system

The invention claimed is:

1. A garment sorting system, wherein the system comprises:

a pairing station to receive a piece of garment hung and paired with a garment hanger by an operator;

a first transporting conveyor arrangement is arranged to receive the garment hanger from the pairing station, the first transporting conveyor arrangement arranged to transport the garment hanger to an identification and sorting arrangement arranged on a second conveyor arrangement;

a plurality of sorting rails, each sorting rail of the plurality of sorting rails including a sorting rail address, the garment sorting system configured to store the sorting rail address for each sorting rail of the plurality of sorting rails in a garment identification database;

a second transporting conveyor arrangement in communication with the first transporting conveyor arrangement, the second transporting conveyor arrangement including:

the identification and sorting arrangement including an identification device arranged to identify the garment hanger from an identification code on the garment hanger or on the garment for further sorting, the identification and sorting arrangement is arranged to request, for each garment hanger, the sorting rail address from the garment identification database; and a plurality of electromechanical sorting interfaces, each electromechanical sorting interface connected to one or more rail of the plurality of sorting rails, each electromechanical sorting interface of the plurality of electromechanical sorting interfaces operable to transport the garment hanger to the sorting rail of the plurality of sorting rails corresponding to the sorting rail address.

2. The garment sorting system according to claim 1, comprising at least one buffer rail including a buffer rail sorting rail address, wherein one or more electromechanical sorting interface of the plurality of electromechanical sorting interfaces are operable to move the garment hanger from the second transporting conveyor arrangement to the buffer rail corresponding to the sorting rail address.

3. The garment sorting system, according to claim 1, wherein the identification device includes one or more of a camera arranged to identify a barcode or a color code, a barcode reader, or a wireless sensor tag reader.

4. The garment sorting system according to claim 3, wherein when the identification device includes a camera, the identification and sorting arrangement is arranged to use artificial intelligence for identification of the garment on the garment hanger.

5. The garment sorting system according to claim 1, wherein identification of the garment hanger by the identification device is triggered by an identification trigger on the second transporting conveyor arrangement.

6. The garment sorting system according to claim 1, wherein the garment identification database is an external garment identification database arranged to be connected to the identification and sorting arrangement, or an internal garment identification database arranged in the identification and sorting arrangement.

7. The garment sorting system according to claim 6, wherein the external garment identification database is arranged to be connected to the identification and sorting arrangement by an application programming interface or a structured query language (SQL) store procedure.

8. The garment sorting system according to claim 1, wherein the garment identification system is arranged to sort unidentified garment hangers to an unidentified garment sorting rail.

9. The garment sorting system according to claim 1, wherein the garment identification system is arranged to detect a garment hanger comprising a final garment of a garment batch.

10. The garment sorting system according to claim 1, wherein the second transporting conveyor arrangement is arranged to transport the garment hangers with a predetermined separation of the garment hangers.

11. A method for sorting garments arranged on garment hangers, wherein the method comprises:

receiving, on a first transporting conveyor arrangement, one or more garment hangers from a pairing station on which a piece of garment is manually hung by an operator and paired with the garment hanger;

transporting, by the first transporting conveyor arrangement, the garment hangers to an identification and sorting arrangement arranged on a second transporting conveyor arrangement;

identifying, by an identification and sorting arrangement comprising an identification device, a garment hanger from an identification code on the garment hanger or on the garment for further sorting;

requesting, for each garment hanger, by the identification and sorting arrangement in communication with a garment identification database, one or more sorting rail addresses from the garment identification database; and transporting, on the second transporting conveyor arrangement, the identified garment hanger to a sorting rail of a plurality of sorting rails, wherein the second transporting conveyor arrangement comprises a plurality of electromechanical sorting interfaces arranged to connect to each sorting rail, such that the identified garment hanger is moved from the second transporting conveyor arrangement to the sorting rail corresponding to the sorting rail address by operation of the corresponding electromechanical sorting interface.

12. The method according to claim 11, wherein when the identification device is a camera, the method comprises using artificial intelligence by the identification and sorting arrangement for identification of the identification code.

13. The method according to claim 11, wherein the method comprises triggering identification of the garment hanger by the identification device by an identification trigger on the first transporting conveyor arrangement.

14. The method according to claim 11, wherein the garment identification database is an external garment identification database arranged to be connected to the identification and sorting arrangement, wherein the method comprises:

connecting the external garment identification database to the identification and sorting arrangement by an application programming interface or a structured query language (SQL) store procedure.

15. The method according to claim 11, wherein the method comprises:

sorting unidentified garment hangers to an unidentified garment sorting rail.

16. The method according to claim 11, wherein the method comprises:

detecting a garment hanger comprising a final garment of a garment batch.

17. The method according to claim 11, wherein the method comprises:

transporting the garment hangers with a predetermined separation of the garment hangers on the second transporting conveyor arrangement.

* * * * *